US008386679B2

(12) United States Patent
Nordstrom et al.

(10) Patent No.: US 8,386,679 B2
(45) Date of Patent: Feb. 26, 2013

(54) DYNAMIC ALLOCATION OF A DIRECT MEMORY ADDRESS WINDOW

(75) Inventors: Gregory M. Nordstrom, Pine Island, MN (US); John T. O'Quin, II, Austin, TX (US); Travis J. Pizel, Rochester, MN (US); Randal C. Swanberg, Round Rock, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/084,793

(22) Filed: Apr. 12, 2011

(65) Prior Publication Data

US 2012/0265916 A1    Oct. 18, 2012

(51) Int. Cl.
*G06F 13/00* (2006.01)
(52) U.S. Cl. ........................ 710/104; 711/165
(58) Field of Classification Search ................ 710/104, 710/305–308; 711/154–165
See application file for complete search history.

(56) References Cited

U.S. PATENT DOCUMENTS 7,398,427 B2   7/2008   Arndt et al.
7,681,083 B2   3/2010   Arndt et al.

OTHER PUBLICATIONS

Lais et al., "Determination of One or More Partitionable Endpoints Affected by an I/O Message," U.S. Appl. No. 12/849,958, filed Aug. 4, 2010, (32 pgs).

*Primary Examiner* — Clifford Knoll
(74) *Attorney, Agent, or Firm* — Toler Law Group (57) ABSTRACT

A computer-implemented method may include determining that a slot coupled to a peripheral component interconnect host bridge is occupied by an input/output adapter. The computer-implemented method may include determining one or more characteristics of the input/output adapter and determining whether the input/output adapter is capable of using additional memory based on the one or more characteristics of the input/output adapter. The computer-implemented method may also include allocating the additional memory for the input/output adapter in response to determining that the input/output adapter is capable of using the additional memory.

20 Claims, 8 Drawing Sheets

DYNAMIC ALLOCATION OF A DIRECT MEMORY ADDRESS WINDOW

FIELD OF THE DISCLOSURE

The present disclosure relates generally to computer systems, and more particularly, to dynamically allocating a direct memory access (DMA) window.

BACKGROUND

In a logically-partitioned computer system that uses a non-virtualized input/output (I/O) adapter, an address translation table may be allocated and assigned to an I/O adapter and to a logical partition. An operating system and applications executing in the logical partition may use the address translation table to enable the I/O adapter to perform I/O operations via direct memory access (DMA) to the memory of the logical partition.

In a computer system that uses a virtualized I/O adapter, the virtualized I/O adapter may provide multiple virtual I/O adapters to multiple logical partitions to enable the multiple logical partitions to access the virtual functions. An address translation table that is designed for use with a non-virtualized hardware I/O adapter may be unsuitable for use with a virtualized I/O adapter. Virtualized I/O adapters may be implemented in many different ways, such as a single root input/output virtualized (SR-IOV) adapter, a multi root I/O virtualized (MR-IOV) adapter, another type of adapter that may be virtualized by a software virtualization intermediary in a hypervisor or virtual I/O hosting operating system (OS) logical partition, or any combination thereof.

SUMMARY

In a particular embodiment, a computer-implemented method includes detecting a peripheral component interconnect host bridge and determining that a slot coupled to the peripheral component interconnect host bridge is occupied by an input/output adapter. The computer-implemented method includes determining one or more characteristics of the input/output adapter and determining whether the input/output adapter is capable of using additional memory based on the one or more characteristics of the input/output adapter. The computer-implemented method also includes allocating the additional memory for the input/output adapter in response to determining that the input/output adapter is capable of using the additional memory.

In another particular embodiment, an apparatus includes a processor and a memory to store program code. The program code is executable by the processor to identify a default address translation table memory that is allocated for use by an input/output adapter. The program code is executable by the processor to determine whether the default address translation table memory satisfies a threshold of a device driver associated with the input/output adapter. The program code is executable by the processor to determine whether there are sufficient resources to create at least one additional direct memory access window in response to determining that the default address translation table memory does not satisfy the threshold of the device driver. The program code is further executable by the processor to create the at least one additional direct memory access window in response to determining that there are sufficient resources.

In another particular embodiment, a computer program product includes a non-transitory computer usable medium having computer usable program code embodied therewith. The computer usable program code is executable by a processor to allocate a default address translation table memory to store an address translation table associated with an input/output adapter. The input/output adapter is capable of hosting a plurality of virtual functions. The computer usable program code is executable by the processor to determine an identifier associated with the input/output adapter. The computer usable program code is further executable by the processor to determine whether the input/output adapter is capable of using additional memory based on the identifier. The computer usable program code is executable by the processor to allocate the additional memory for the input/output adapter in response to determining that the input/output adapter is capable of using the additional memory.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

In a virtualized system, enabling multiple logical partitions to perform input/output (I/O) operations may include assigning each logical partition a hardware I/O adapter. An address translation table may be created to enable the hardware I/O adapter to perform direct memory access (DMA) I/O operations to the memory of the individual logical partitions of the virtualized system. A DMA window is a defined region of memory address space that correlates through address translation tables to regions of host system memory. A DMA window may also be referred to as a DMA space. The DMA window is what an I/O adapter (and corresponding device driver) sees as a contiguous region of memory space that it can read from and write to as a DMA master.

The size of a DMA window may be proportional to how much memory is allocated to translation tables. If a DMA window is relatively small (e.g., the I/O adapter is capable of using a large DMA window), the smaller DMA window may cause the device driver to re-map host memory pages more frequently as the adapter performs I/O to host memory, which may result in slower I/O operations.

Each hardware I/O adapter may be plugged into a slot, such as a peripheral component interconnect (PCI) slot, on a motherboard. The term PCI in this disclosure refers to the PCI standard, as well as variants and extensions of the PCI standard, such as PCI-express (PCI-e).

Particular types of hardware I/O adapters, such as single root I/O virtualization (SR-IOV) adapters and multi root I/O virtualization (MR-IOV) adapters, may be virtualized to create virtual I/O adapters (referred to as virtual functions) to be assigned to each logical partition. A single virtualized hardware I/O adapter may be capable of providing multiple virtual functions for use by multiple logical partitions. The address translation table may be subdivided based on the number or virtual aspects of the virtual I/O adapters to enable the virtual functions to access the memory of the logical partitions. For example, a specific portion of the address translation table may be subdivided and provided to a virtual I/O adapter. A logical partition that is assigned to the I/O adapter may use the specific portion of the subdivided address translation table to enable the virtual I/O adapter to access the memory of that logical partition.

Device drivers for I/O adapters may utilize address translation tables to translate between PCI bus memory addresses and host system memory addresses. These translations create one or more DMA windows (e.g., mappings) from the I/O adapter into regions of physical system memory. The one or more DMA windows serve to isolate DMA transactions between system memory regions reserved for individual logical partitions that share the adapter and to enable an I/O adapter to address a large physical system memory using a smaller range of PCI memory addresses.

The DMA windows may use translation tables in the host system memory that are created and managed by a supervisory agent (e.g., a hypervisor or an operating system kernel) and referenced by a PCI host bridge during DMA transactions initiated by an I/O adapter. During DMA operations from an I/O adapter to the host system memory, host system PCI hardware may translate PCI memory addresses to physical memory addresses using address translation tables that create a DMA window for that I/O adapter into host memory.

DMA window sizes may have a default size (e.g., less than 4 GB) due to the 32 bit addressing schemes used by legacy computing components (e.g., hardware and software). These default DMA window sizes may be inadequate for higher capacity I/O adapters that are capable of using 64 bit addressing, have higher bandwidth operations (e.g., InfiniBand), are capable of using multiple DMA windows, or any combination thereof. To accommodate these higher capacity I/O adapters, supervisory agents (e.g., device drivers, logical partitions, and hypervisors) may periodically modify entries in the translation table to associate different host memory regions, or pages, with the range of the PCI memory comprising the DMA window that may be targeted by I/O adapters for DMA. Because modifying the translation table may involve software overhead in the device driver and/or the translation table management, the frequency with which the translation table is modified may adversely affect adapter performance (e.g., throughput).

By taking into account the various types of I/O adapters and their associated capabilities when allocating and managing DMA windows and the corresponding address translation tables, I/O adapter performance may be improved. For example, a number of DMA windows that are allocated and a size of each DMA window that is allocated may vary based on the capabilities of each I/O adapter, the capabilities of a device driver associated with each I/O adapter, the capabilities of an operating system to which the I/O adapter is assigned, or any combination thereof. By allocating larger (e.g., larger than the default size) DMA windows, DMA window translation modifications may be reduced, thereby increasing I/O adapter throughput. To do so, DMA window translation table management algorithms and methodologies may account for a wide range of translation table sizes based on the performance characteristics of the particular I/O adapter and based on the device driver associated with the particular I/O adapter. For example, a default DMA window may be used for 32-bit addressing while the I/O adapter may be capable of 64-bit (or greater) addressing. By allocating additional memory for the DMA window, a device driver or an operating system that is capable of utilizing 64-bit (or greater) address may use the additional memory for a larger than default DMA window or for multiple DMA windows.

A PCI Single Root I/O Virtualization (SR-IOV) adapter may host multiple virtual functions for use by individual device drivers of operating systems that are executing within logical partitions. An SR-IOV adapter may host a variety of virtual functions, including Fibre Channel (FC), serial attached small computer systems interface (SAS), Ethernet, InfiniBand, and Fiber Channel over Ethernet (FCoE).

When enabling logical partitions to access virtual functions of an SR-IOV adapter, the virtual functions may be isolated to prevent a device driver in one logical partition from accessing the DMA addresses that reference memory belonging to other logical partitions. To provide this isolation, each virtual function may be provided with its own DMA window through which that virtual function can reference the host memory of the logical partition to which the virtual function is assigned.

Additionally, in a logically partitioned computer system, it is common to dynamically remove an I/O adapter from the control of a first logical partition and reassign the I/O adapter to the control of a second logical partition, where the second logical partition may have a different device driver than the first logical partition. This in turn may affect the required size and placement of the DMA window and the associated address translation tables for the adapter. Thus, DMA window management algorithms cannot rely on system boot time initialization states and adapter presence to determine the size and placement of DMA windows, as these may dynamically change during the operation of the system. To accommodate the various capabilities of I/O adapters and to accommodate situations where an I/O adapter may be dynamically reassigned from one logical partition to another, different methods to enable dynamic reconfiguration of DMA windows and the associated address translation tables are described below.

A supervisory agent, such as a hypervisor, may provide various functions to enable creating one or more DMA windows and the associated address translation tables based on the capabilities of each I/O adapter in the system. During a boot time period (e.g., initial program load), the hypervisor may determine capabilities of each I/O adapter and the associated device driver and allocate additional address translation table memory for one or more of the I/O adapters based on the capabilities. During a run time period, a device driver or an operating system may query the available DMA resources, such as the additional DMA memory space that was allocated (e.g., reserved) for a particular I/O adapter.

Figure 4:
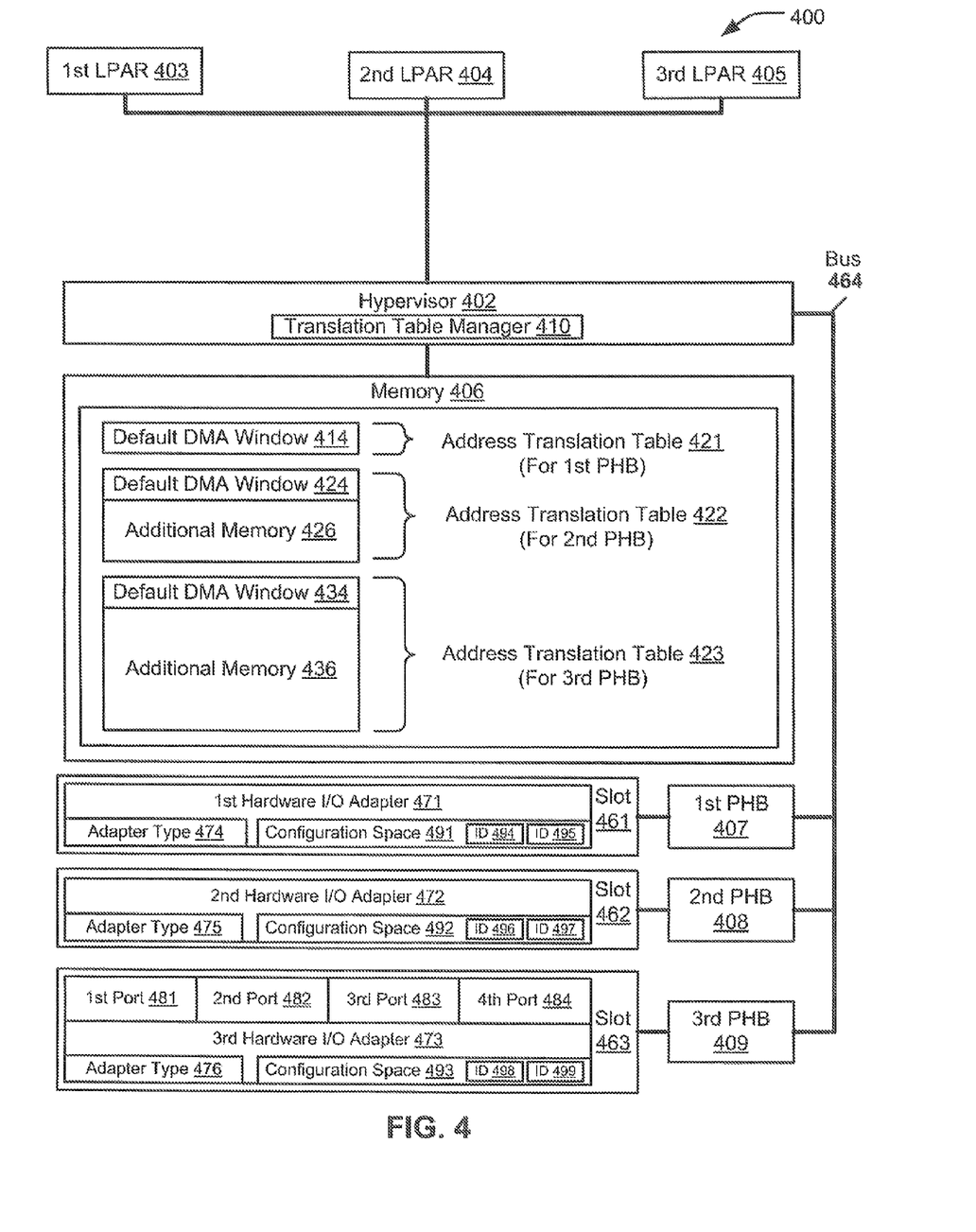
FIG. 4 is a block diagram of a fourth embodiment of a system that includes a direct memory address window associated with a hardware input/output adapter.
Figure 5:
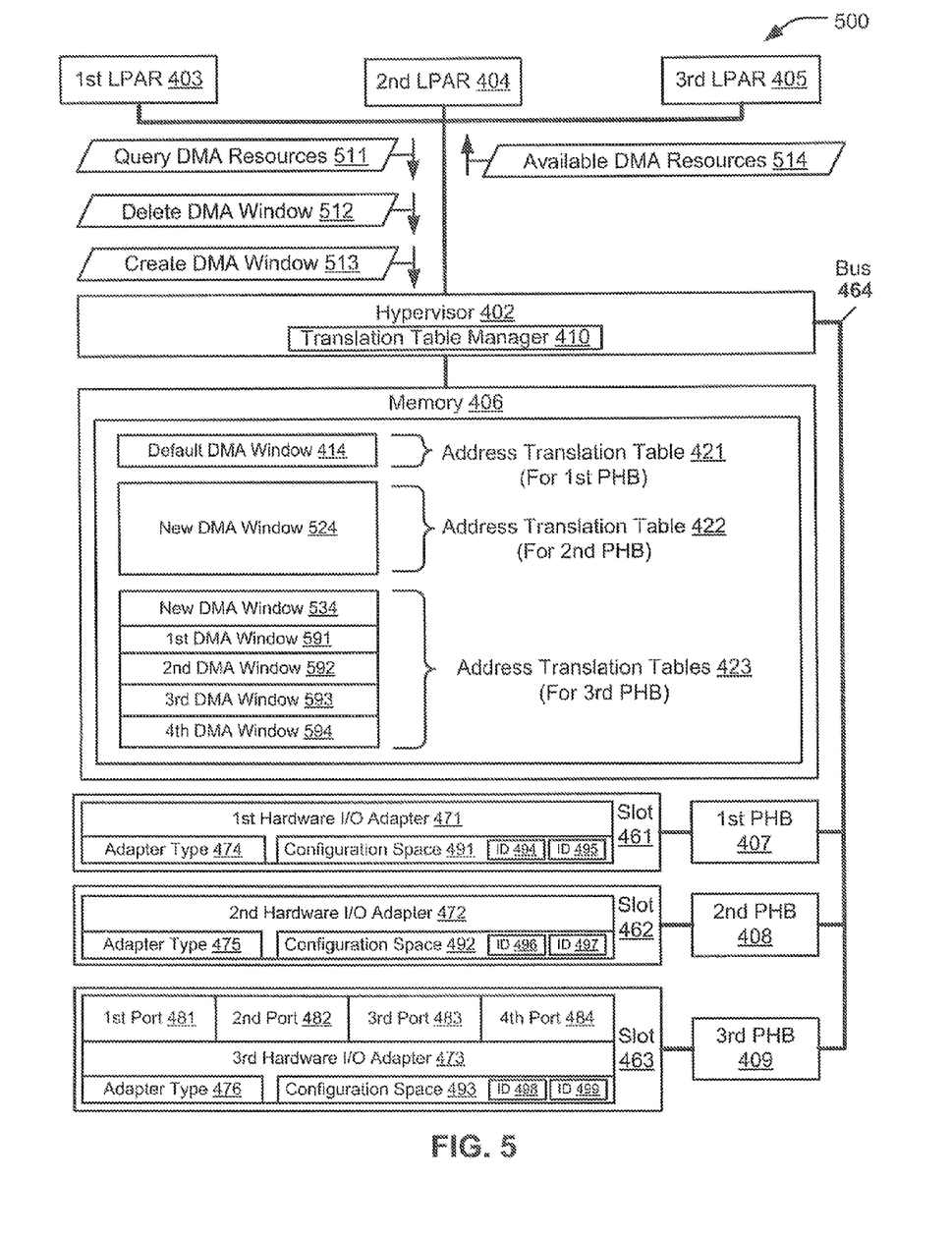
FIG. 5 is a block diagram of a fifth embodiment of a system that includes a direct memory address window associated with a hardware input/output adapter.

In one embodiment, the device driver or operating system may combine the additional DMA memory space (e.g., the additional memory 426 and 436) with a default DMA memory space (e.g., the default DMA window 424 and 434)

to accommodate a DMA window that is larger than the default DMA memory space. For example, the default DMA window 424 may be used for 32-bit addressing while the new DMA window 524 may be used for 64-bit (or greater) addressing. The device driver or operating system may use the larger DMA window (e.g., the new DMA window 524) for the I/O adapter. The device driver or operating system may subdivide the larger DMA memory space into multiple address translation table based on the capabilities of the I/O adapter. For example, the new DMA window 534 that is created by combining the default window 434 with the additional memory 436 may be subdivided to provide DMA windows for each port of the I/O adapter, for each virtual function that is hosted by the I/O adapter, for each physical function of the I/O adapter, etc. In another embodiment, the device driver or operating system may repeatedly create additional DMA windows (e.g., instead of subdividing) to provide an address translation table for each port of the I/O adapter or an address translation table for each virtual function that is hosted by the I/O adapter. If a translation table is smaller than the I/O adapter is capable of using (e.g., the translation table uses 32-bit addressing while the I/O adapter is capable of 64-bit addressing), the translation table may cause a device driver to re-map host memory pages more frequently as the adapter performs I/O to host memory, which may result in slower I/O operations. By enabling a DMA window associated with the I/O adapter to be resized based on the capabilities of the I/O adapter, the device driver may reduce how often the host memory pages are remapped, resulting in faster I/O performance, particularly for adapters that have high bandwidth capabilities. The DMA window may be resized based on the capabilities of the I/O adapter, based on capabilities of a device driver associated with the I/O adapter, based on capabilities of an operating system associated with the I/O adapter, based on capabilities of a logical partition associated with the I/O adapter, or any combination thereof. For example, the DMA window may be increased in size over a default DMA window size (e.g., a DMA window that uses 32-bit addressing) to enable creation of a large DMA window based on the 64-bit addressing capabilities of the I/O adapter. As another example, a larger than default-sized DMA window may enable creation of multiple DMA windows based on the number of ports or the number of virtual functions associated with the I/O adapter.

Figure 1:
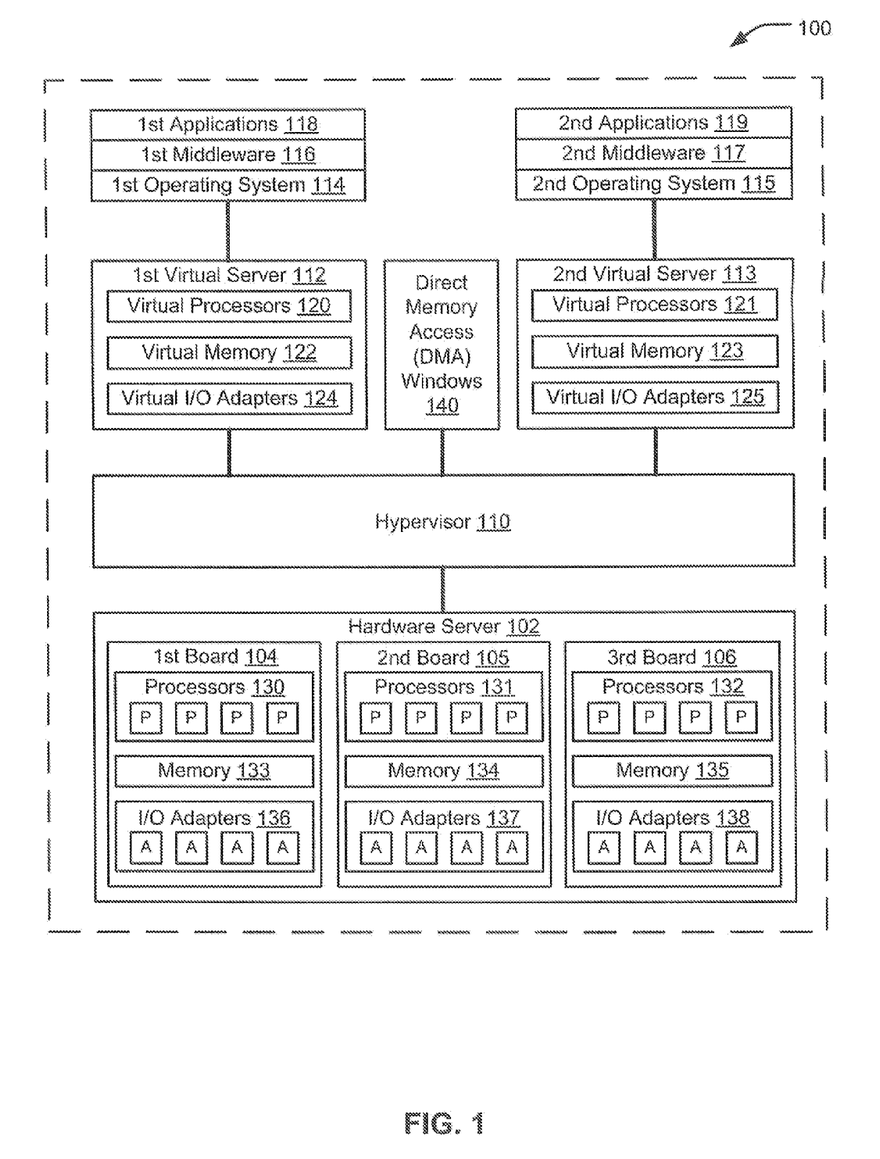
FIG. 1 is a block diagram of a first embodiment of a system that includes a direct memory address window associated with a hardware input/output adapter.

Referring to FIG. 1, a block diagram of a first embodiment of a system that includes a direct memory address (DMA) window associated with a hardware input/output (I/O) adapter is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and I/O adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

In the system 100, a particular I/O adapter of the I/O adapters 136-138 may be virtually divided to enable the particular I/O adapter to be used by more than one virtual server. For example, the virtual server 112 may use a virtual I/O adapter that is hosted by one of the hardware I/O adapters 136-138. The hypervisor 110 may create DMA windows 140 to enable the virtual I/O adapters 124 and 125 to perform DMA I/O operations to the virtual memory of the virtual servers 112 and 113. The hypervisor 110 may allocate the DMA windows 140 during a first time period (e.g., an initial program load time period, a boot time period, or a first run time period). The hypervisor 110 may enable the DMA windows 140 to be queried, dynamically resized, and deleted during a second time period that occurs after the first time period. The DMA windows 140 may be dynamically resized to enable the use of a larger address translation table or multiple address translation tables with one or more of the I/O adapters 136-138.

Figure 2:
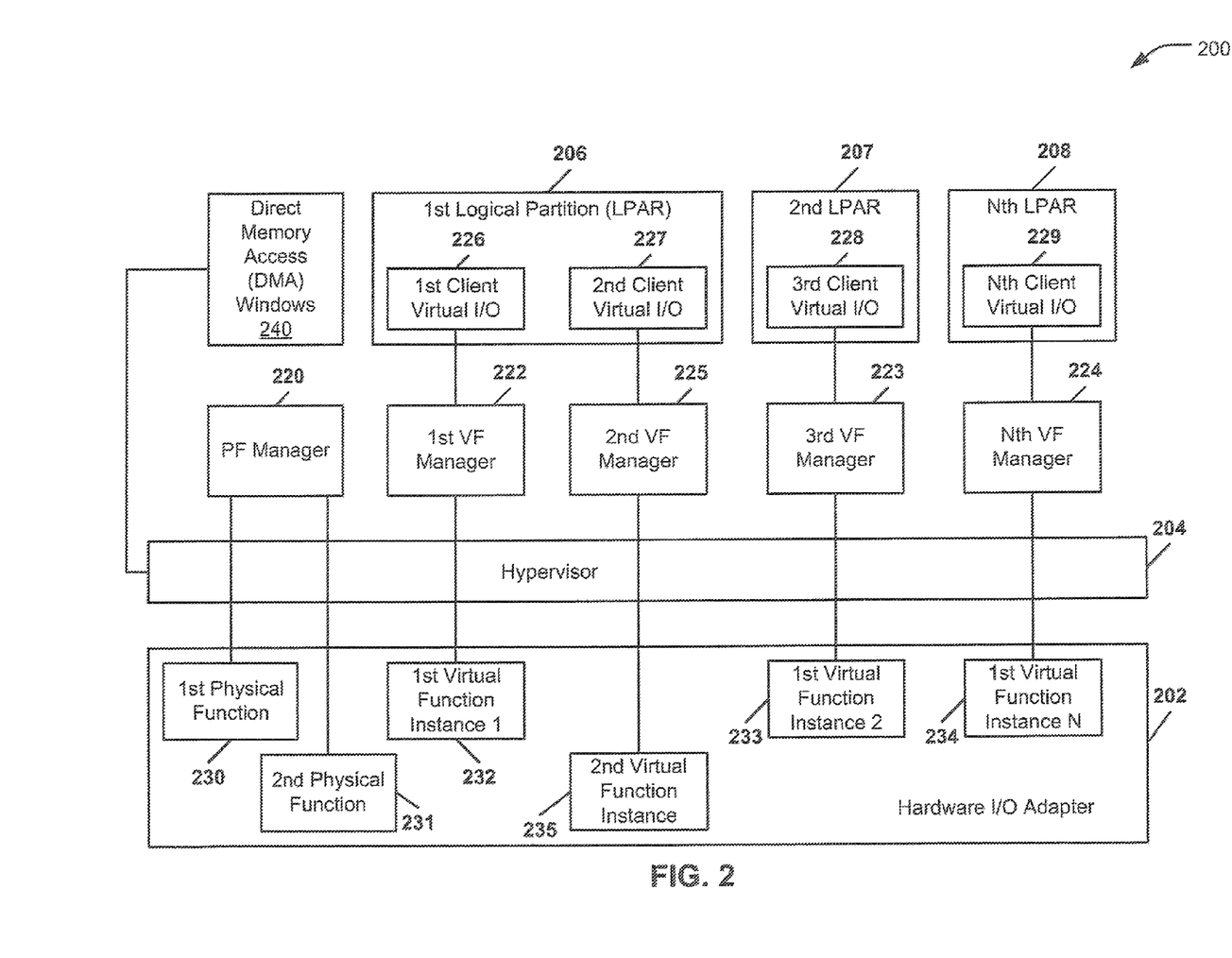
FIG. 2 is a block diagram of a second embodiment of a system that includes a direct memory address window associated with a hardware input/output adapter.

Referring to FIG. 2, a block diagram of a second embodiment of a system that includes a direct memory address (DMA) window associated with a hardware input/output (I/O) adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230 and 231 may include peripheral component interconnect (PCI) functions that support single root I/O virtualization (SR-IOV) capabilities. Each of the virtual functions 232-235 may be associated with one of the physical functions 230 and 231 and may share one or more physical resources of the hardware I/O adapter 202.

Software modules, such as a physical function (PF) manager 220 and virtual function (VF) managers 222-225, may assist the hypervisor in managing the physical functions 230, 231 and the virtual functions 232-235. In a particular embodiment, the PF managers may be referred to as PF adjuncts and the VF managers may be referred to as VF adjuncts. For example, a user may specify a particular configuration and the PF manager 220 may configure the virtual functions 232-235 from the physical functions 230, 231 accordingly. The VF managers 222-225 may function as virtual device drivers. For example, just as a device driver for a physical device may enable a client application to access the functions of the device, each of the VF managers 222-225 may enable a client application to access the virtual functions 232-235. In the system 200, the VF managers 222 and 224-225 may enable access to the first virtual function instances 232 and 234-235, and the second VF manager 225 may enable access to the second virtual function 235.

The hypervisor 204 may allocate multiple DMA windows 240 and assign at least one DMA window to each of the virtual functions 232-235. For example, the hypervisor 204 may assign a first DMA window of the DMA windows 240 to the first instance of the first virtual function 232 and assign a second DMA window of the DMA windows 240 to the instance of the second virtual function 235. The instance of the first virtual function 232 may access the memory of the first client virtual I/O 226 via the first DMA window. The instance of the second virtual function 235 may access the memory of the second client virtual I/O 227 via the second DMA window.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF manager 222. The second client virtual I/O 227 may access the second virtual function 235 via the second VF manager 225. A third client virtual I/O 228 executing at the second logical partition 207 may access the second instance of the first virtual function 233 via the third VF manager 223. An Nth client virtual I/O 229 executing at the Nth logical partition 208 may access the Nth instance of the first virtual function 233 via the Nth VF manager 224.

Thus, the hypervisor 204 may enable the client virtual I/Os 226-229 to access the virtual functions 232-235 that are associated with the physical functions 230, 231 of the hardware I/O adapter 202. The hypervisor 204 may allocate the DMA windows 240 during an initial program load (IPL) time period, a boot time period, or a run time period. The hypervisor 204 may enable the DMA windows 240 to be queried, dynamically resized, and deleted during the run time period. The DMA windows 240 may be dynamically resized to enable the use of a larger address translation table or multiple address translation tables with the I/O adapter 202.

It will be appreciated by one skilled in the art that the present invention is equally suited to embodiments that do not utilize a virtual function (VF) manager (e.g., one of the VF managers 222-224) and client virtual I/O to enable a logical partition (e.g., one of the logical partitions 206-208) to access a virtual function (e.g., one of the virtual functions 232-235), and instead enable a device driver within the logical partition to directly manage the virtual function.

Figure 3:
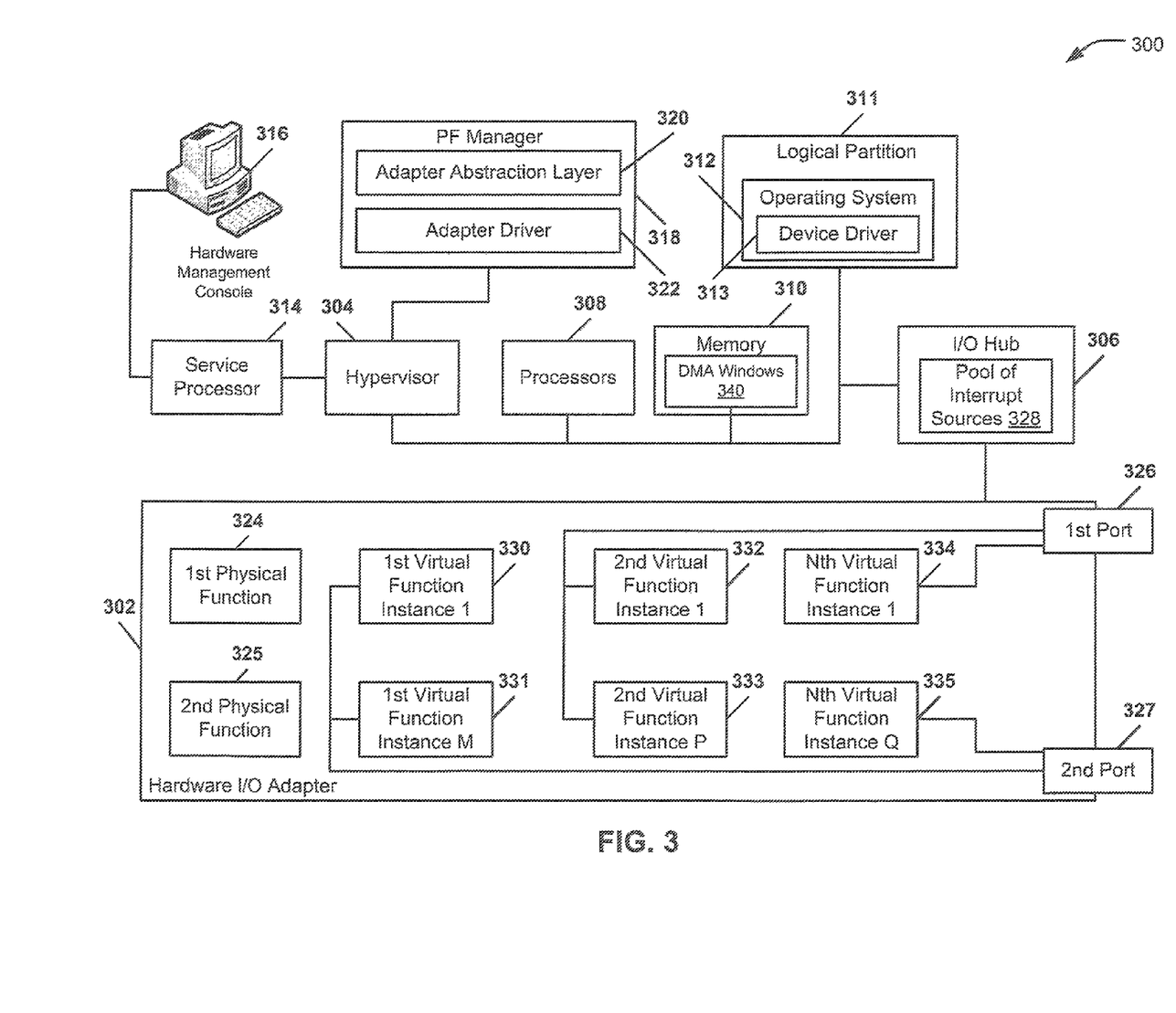
FIG. 3 is a block diagram of a third embodiment of a system that includes a direct memory address window associated with a hardware input/output adapter.

Referring to FIG. 3, a block diagram of a third embodiment of a system that includes a direct memory address (DMA) window associated with a hardware input/output (I/O) adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302 via one or more device drivers in the operating system 312. For example, the device driver 313 may enable client applications executing in the operating system 312 to perform I/O operations via one or more of the virtual functions 330-335. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324 and 325 of the hardware I/O adapter 302. The hypervisor 304 may create multiple DMA windows to enable DMA operations between the device driver 313 and the virtual function instances 330-335. A number of DMA windows 340 may be allocated in the memory 310 based on a number of the ports 326 and 327, a number of the physical functions 324 and 325, a number of the virtual functions 330-335 that are associated with the hardware I/O adapter 302, another characteristic of the hardware I/O adapter 302, or any combination thereof. The hypervisor 304 may allocate the DMA windows 340 during a first time period, such as an initial program load (IPL) time period, a boot time period, or a run time period. The hypervisor 304 may enable the DMA windows 340 to be queried, dynamically resized, and deleted during a second time period that occurs after the first time period. The DMA windows 340 may be dynamically resized to enable the use of a larger address translation table or multiple address translation tables with the I/O adapter 302.

Referring to FIG. 4, a block diagram of a fourth embodiment of a system that includes a direct memory address (DMA) window associated with a hardware input/output (I/O) adapter is depicted and generally designated 400. The system 400 includes a hypervisor 402 that manages multiple logical partitions (LPARs), such as a first logical partition 403, a second logical partition 404, and a third logical partition 405. The hypervisor 402 may be coupled to a memory 406 and to one or more peripheral component interface (PCI) host bridges (PHBs), such as a first PHB 407, a second PHB 408, and a third PHB 409, via a bus 464.

The first PHB 407 may be coupled to a slot 461 into which a hardware adapter, such as a first hardware I/O adapter 471, may be inserted. The second PHB 408 may be coupled to a slot 462 into which a hardware adapter, such as a second hardware I/O adapter 472, may be inserted. The third PHB 409 may be coupled to a slot 463 into which a hardware adapter, such as the third hardware I/O adapter 473 may be inserted.

An operating system and multiple applications may execute in each of the logical partitions 403-405. The operating systems executing in the logical partitions 403-405 may include one or more device drivers (e.g., the device driver 313 of FIG. 2) that are capable of performing I/O operations with the hardware I/O adapters 471-473. One or more of the hardware I/O adapters 471-473 may be an SR-IOV or MR-IOV adapter that is capable of hosting multiple virtual functions.

The hypervisor 402 may include a translation table manager 410. The translation table manager 410 may manage direct memory access (DMA) windows in the memory 406. For example, the translation table manger 410 may enable a device driver or an operating system executing in one of the logical partitions 403-405 to query DMA resources to determine available DMA resources, to create one or more DMA windows, and to delete one or more DMA windows.

The first hardware I/O adapter 471 may include an adapter type 474 and a configuration space 491. The configuration space 491 may include an identifier 494 and an identifier 495. The adapter type 474 may identify a type of the first hardware I/O adapter 471. For example, the adapter type 474 may identify whether the first hardware I/O adapter 471 is an SR-IOV adapter, an MR-IOV adapter, a Fibre Channel (FC) adapter, a serial attached small computer systems interface (SAS) adapter, an Ethernet adapter, an InfiniBand adapter, a Fiber Channel over Ethernet (FCoE) adapter, another type of I/O adapter, or any combination thereof. The configuration space 491 may include registers (not shown) that may be used to configure the first hardware I/O adapter 471. The identifiers 494-495 in the configuration space 491 may identify various characteristics of the first hardware I/O adapter 471. For example, the identifier 494 may include a vendor identifier that identifies a manufacturer or reseller associated with the first hardware I/O adapter 471. The identifier 495 may include a device identifier associated with the first hardware I/O adapter 471.

The second hardware I/O adapter 472 may include an adapter type 475 and a configuration space 492. The configuration space 492 may include an identifier 496 and an identifier 497. The adapter type 475 may identify a type of the second hardware I/O adapter 472. For example, the adapter type 475 may identify whether the second hardware I/O adapter 472 is an SR-IOV adapter, an MR-IOV adapter, an FC adapter, a SAS adapter, an Ethernet adapter, an InfiniBand adapter, an FCoE adapter, another type of I/O adapter, or any combination thereof. The configuration space 492 may include registers (not shown) that may be used to configure the second hardware I/O adapter 472. The identifiers 496-497 may identify various characteristics of the second hardware I/O adapter 472. For example, the identifier 496 may include a vendor identifier and the identifier 497 may include a device identifier associated with the second hardware I/O adapter 472.

The third hardware I/O adapter 473 may include an adapter type 474 and a configuration space 493. The third hardware I/O adapter 473 may include multiple ports, such as a first port 481, a second port 482, a third port 483, and a fourth port 484. The configuration space 493 may include an identifier 498 and an identifier 499. The adapter type 476 may identify a type of the third hardware I/O adapter 473. For example, the adapter type 476 may identify whether the third hardware I/O adapter 473 is an SR-IOV adapter, an MR-IOV adapter, an FC adapter, a SAS adapter, an Ethernet adapter, an InfiniBand adapter, an FCoE adapter, another type of I/O adapter, or any combination thereof. The configuration space 493 may include registers (not shown) that may be used to configure the third hardware I/O adapter 473. The identifiers 498-499 in the configuration space 493 may identify various characteristics of the third hardware I/O adapter 473. For example, the identifier 498 may include a vendor identifier that identifies a manufacturer or reseller associated with the third hardware I/O adapter 473. The identifier 499 may include a device identifier associated with the third hardware I/O adapter 473.

In operation, the hypervisor 402 may detect and configure one or more of the PHBs 407-409. The hypervisor 402 may determine that one or more of the PHBs 407-409 is coupled to a slot that is occupied by an I/O adapter. For example, the hypervisor 402 may determine that the first PHB 407 is coupled to the slot 461 that is occupied by the first hardware I/O adapter 471, the second PHB 408 is coupled to the slot 462 that is occupied by the second hardware I/O adapter 472, and the third PHB 409 is coupled to the slot 463 that is occupied by the third hardware I/O adapter 473. The hypervisor 402 may allocate a default DMA window that corresponds to each of the slots that are coupled to the PHBs 407-409. For example, the hypervisor 402 may allocate a default DMA window 414 for the slot 461, allocate a default DMA window 424 for the slot 462, and allocate a default DMA window 434 for the slot 463. The hypervisor 402 may allocate the default DMA windows 414, 424, and 434 during a first time period, such as an initial program load (IPL) time period, a boot time period, or a run time period. The default DMA windows 414, 424, and 434 may be a default size to enable compatibility with device drivers or operating systems that use 32-bit addressing rather than 64-bit (or larger) addressing.

The hypervisor 402 may determine whether one of the slots 461-463 is a location that is automatically allocated additional memory (e.g., expansion space). For example, in the system 400, the hypervisor 402 may determine that the slots 462 and 463 are automatically assigned expansion space. If the hypervisor 402 determines that a particular location (e.g., slot) is automatically allocated expansion space, the hypervisor 402 may allocate the expansion space and associate the expansion space with the I/O adapter. For example, the hypervisor 402 may determine that the slot 462 is occupied by the hardware I/O adapter 472 and that the slot 462 is automatically allocated expansion space. In response, the hypervisor 402 may allocate additional memory 426 (e.g., expansion space) and assign the additional memory 426 to the second hardware I/O adapter 472 that occupies the slot 462. The hypervisor 402 may determine that the slot 463 is automatically allocated expansion space when the slot 463 is occupied, allocate additional memory 436, and assign the additional memory 436 to the third hardware I/O adapter 473.

The default DMA window 414 may be used to store an address translation table 421 for the first PHB 407. The default DMA window 424 and the additional memory 426 may be used to store an address translation table 422 for the second PHB 408. The default DMA window 434 and the additional memory 436 may be used to store an address translation table 423 associated with the third PHB 409.

The hypervisor 402 may determine one or more characteristics of a particular hardware I/O adapter, such as one of the hardware I/O adapters 471-473, and allocate additional expansion space based on the one or more characteristics of the particular hardware I/O adapter. For example, the hypervisor 402 may allocate the additional memory 426 based on the adapter type 475, one or more of the identifiers 494, 496, and 498 (e.g., a device identifier), one or more of the identifiers 495, 497, and 499 (vendor identifier), another characteristic of the hardware I/O adapters 471-473, or any combination thereof. For example, the hypervisor 402 may allocate the additional memory 426 based on the adapter type 475, the identifier 496 (e.g., vendor identifier), the identifier 497 (e.g., device identifier), another characteristic of the second hardware I/O adapter 472, a characteristic of a device driver (e.g., the device driver 313 of FIG. 3) that is associated with the second hardware I/O adapter 472, a characteristic of a logical partition (e.g., one of the logical partitions 403-405) that is associated with the second hardware I/O adapter 472, or any combination thereof. The hypervisor 402 may allocate the additional memory 436 based on the adapter type 476, the identifier 498 (e.g., vendor identifier), the identifier 499 (e.g., device identifier), a number of the ports 481-484, a number of physical functions associated with the third hardware I/O adapter 473, a number of virtual functions hosted by the third hardware I/O adapter 473, another characteristic of the third hardware I/O adapter 473, or any combination thereof. The hypervisor 402 may determine to not allocate additional DMA space for the first hardware I/O adapter 471 based on the adapter type 474, the identifier 494 (e.g., vendor identifier), the identifier 495 (e.g., device identifier), another characteristic of the first hardware I/O adapter 471, or any combination thereof.

Thus, the hypervisor 402 may allocate the default DMA windows 414, 424, and 434 for each of the hardware I/O adapters 471-473 that occupies a slot that is coupled to one of the PHBs 407-409. The hypervisor 402 may allocate additional DMA space, such as the additional memory 426 or the additional memory 436, based on the location (e.g., slot) of a particular hardware I/O adapter, based on a characteristic of the particular hardware I/O adapter (e.g., one or more of the identifiers 494-499), another characteristic of the particular hardware I/O adapter (e.g., subsystem identifier or other identifier), a characteristic of a device driver or a logical partition associated with the hardware I/O adapter, or any combination thereof. For example, the hypervisor 402 may allocate the additional memory 436 in response to determining that the slot 463 is automatically assigned additional DMA space when the slot 463 is occupied by a hardware I/O adapter that is capable of hosting multiple virtual functions (e.g., an SR-IOV adapter). The default DMA windows 414, 424, 434, and the additional memory 426 and 436 may be allocated at a first time period (e.g. an initial program load time, a boot time period, or a run time period). The additional memory 426 and 436 may be used, at a later time period, to dynamically create a large address translation table or to create multiple address translation tables.

Referring to FIG. 5, a block diagram of a particular embodiment of a system that includes a direct memory address window associated with a hardware input/output (I/O) adapter is depicted and generally designated 500. The system 500 illustrates how the DMA windows 414, 424, and 434 of FIG. 4 may be dynamically modified by an operating system or a device driver in one of the logical partitions 403-405. After being allocated, the DMA windows 414, 424, and 434 of FIG. 4 may be dynamically modified at a later time period, such as during a run time period, as illustrated in FIG. 5.

In operation, a device driver or an operating system (O/S) executing in one of the logical partitions 403-405 may determine whether the default DMA window associated with a particular hardware I/O adapter satisfies a threshold. For example, the device driver may be capable of utilizing additional translation table memory with a particular hardware I/O adapter to enable additional functionality of the hardware I/O adapter or to increase throughput. The device driver or the O/S may send a query DMA resource 511 message to the translation table manager 410 to determine whether there are sufficient DMA resources (e.g., sufficient memory) available to create an appropriately sized DMA window or additional DMA windows for the particular hardware I/O adapter. The device driver or O/S may receive an available DMA resources 514 message from the translation table manager 410 that identifies DMA resources (e.g., memory available for allocation to one or more translation tables) that are available in the system 500. For example, the available DMA resources 514 message may indicate that the additional memory 426 and 436 of FIG. 4 are available.

If the available DMA resources 514 are sufficient to create one or more additional DMA windows, the device driver or the O/S may send a create DMA window 513 message to the translation table manager 410 to create one or more additional DMA windows. For example, a device driver in the logical partition 403 may use the create DMA window 513 command to combine the default DMA window 424 and the additional memory 426 of FIG. 4 to create the new DMA window 524. The new DMA window 524 may enable the address translation table 422 In a particular embodiment, the default DMA window 424 may be deleted by sending a delete DMA window 512 command to the translation table manager 410 prior to sending the create DMA window 513 command.

The create DMA window 513 command may be sent more than once to create multiple DMA windows for multiple address translation tables. For example, the default DMA window 434 and the additional memory 436 of FIG. 4 may be combined to create a new DMA window 534. The create DMA window 513 command may be repeatedly called to create multiple DMA windows, such as DMA windows 591, 592, 593, and 594. The DMA windows 591-594 may correspond to translation tables associated with a number of physical functions associated with the third hardware I/O adapter 473, a number of virtual functions hosted by the third hardware I/O adapter 473, another characteristic of the third hardware I/O adapter 473, or any combination thereof. For example, the first DMA window 591 may correspond to a first address translation table (e.g., of the address translation tables 423) to access the first port 481. The second DMA window 592 may correspond to a second address translation table to access the second port 482. The third DMA window 593 may correspond to a third address translation table to access the third port 483, and the fourth DMA window 594 may correspond to a fourth address translation table to access the fourth port 484. As another example, the first DMA window 591 may correspond to a first address translation table of the address translation tables 423 to access a first virtual function of the third hardware I/O adapter 473, the second DMA window 592 may correspond to a second address translation table to access a second virtual function of the third hardware I/O adapter 473, the third DMA window 593 may correspond to a third address translation table to access a third virtual function of the third hardware I/O adapter 473, and the fourth DMA 594 may correspond to a second address translation table to access a fourth virtual function of the third hardware I/O adapter 473.

One or more of the address translation tables 421-423 may be used by the hypervisor 402 to translate a 32-bit address (e.g., a 32-bit PCI bus address) to a 64 bit physical space. For example, a portion (e.g., 12-bits) of a particular 32-bit address may be an offset to access an entry in one of the address translation tables 421-423. Each of the DMA windows 414, 524, 534, and 591-594 may represent how a logical partition (e.g., one of the logical partitions 403-405) view the address translation tables 421-423. In a particular embodiment, the create DMA window 513 command may be used to create multiple DMA windows supporting multiple page sizes. The multiple page sizes may be used if an operating system or device driver in a particular logical partition supports multiple page sizes. For example, the create DMA window 513 command may be used to create a translation table in which each entry of the translation table accesses a particular memory size. To illustrate, a logical partition may view a DMA window that has a size of 64 gigabytes (GB). If each entry of a translation table were to enable access to 4 kilobytes (KB) of memory, the translation table may have millions of entries to access the full 64 GB of memory. Having a translation table with millions of entries may result in allocating a large amount of memory for the translational table and may result in inefficient memory access. If each entry of the translation table were to enable access to 16 GB of memory, the translation table may have only four entries. While the resulting fewer entries may result in a smaller translation table, the 16 GB of memory that is accessed by each entry in the translation table may not be suited for certain applications. If each entry of the translation table were to enable access to 16 megabyte (MB) of memory, the translation table may strike a balance between allocating too many entries or too few entries for a translation table to access 64 GB of memory. Thus, by specifying, via the create DMA window 513 command, the size of a memory that may be accessed by each entry in the translation table, the number of entries in the translation table may be adjusted for the needs of a particular application. One or more of the DMA windows 414, 524, 534, and 591-594 may differ in terms of how much memory their corresponding entries are capable of accessing. For example, a first DMA window of the DMA windows 414, 524, 534, and 591-594 may have an address translation table with entries that enable access to a first memory size and a second DMA window of the DMA windows 414, 524, 534, and 591-594 may have an address translation table with entries that enable access to a second memory size.

Thus, a device driver or O/S executing in one of the logical partitions 403-405 may use commands, such as the query DMA resources 511, the delete DMA window 512, and the create DMA window 513, to dynamically query, add, delete, and modify DMA windows. The DMA windows may be modified to accommodate a larger translation table or multiple translation tables. The query DMA resources 511 command may be used to query the available DMA resources (e.g., memory available for allocation to one or more DMA windows) to determine whether there are sufficient DMA resources available to allocate one or more additional DMA windows. The delete DMA window 512 may be used to delete a DMA window that is not longer being used, such as a default DMA window (e.g., a DMA window that has a pre-determined size). The create DMA window 513 command may be used to create a new DMA window, such as the new DMA windows 524 and 534. The new DMA window may replace the default DMA window. The new DMA window may combine the default DMA window with an additional DMA window that was allocated by the hypervisor 402. The new DMA window may be used for a large DMA window, such as the new DMA window 524. The new DMA window may be used for multiple DMA windows, such as the DMA windows 591-594.

Figure 6:
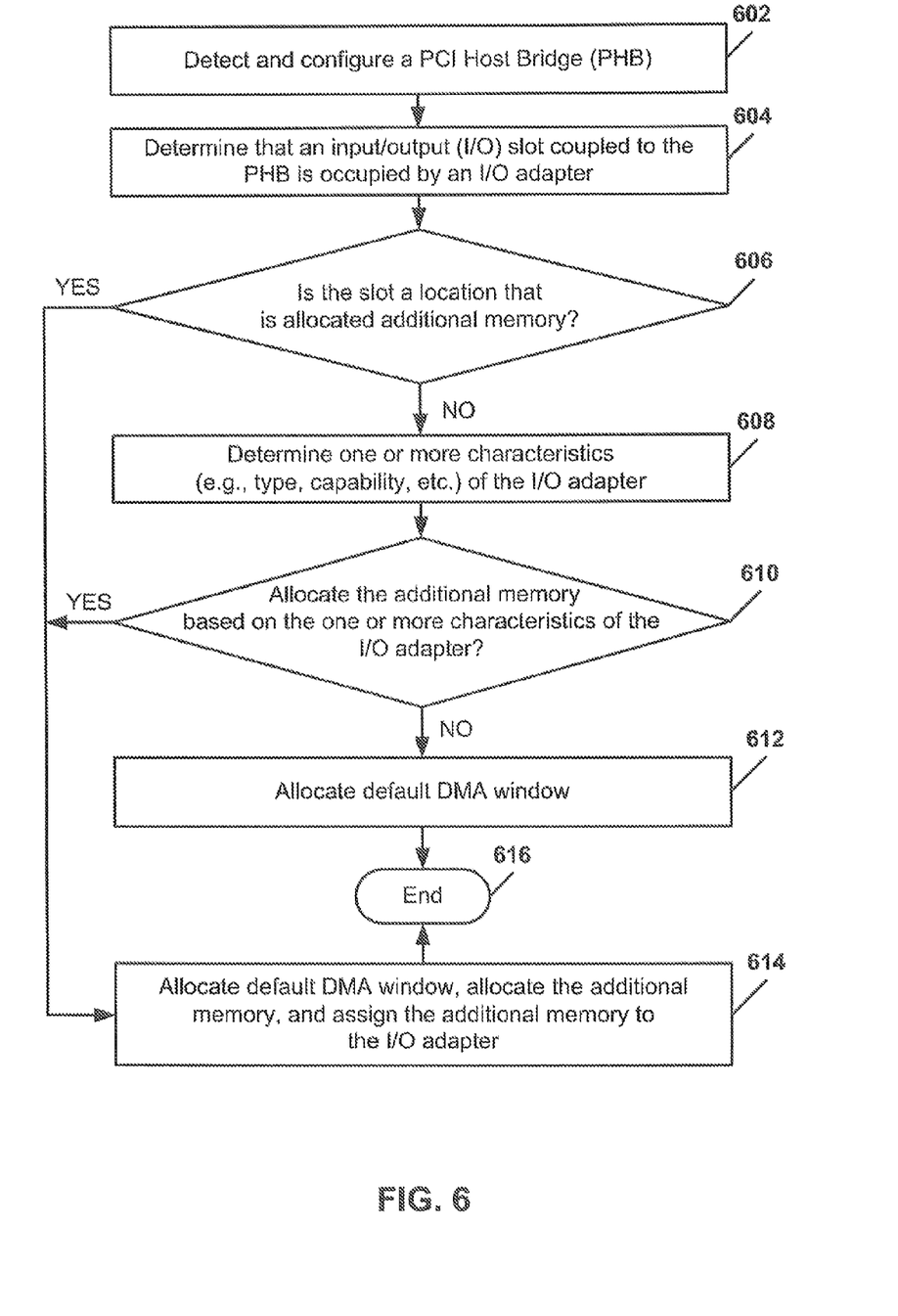
FIG. 6 is a flow diagram of a first method to allocate a direct memory address window associated with a hardware input/output adapter.

Referring to FIG. 6, a flow diagram of a first method to allocate a direct memory address window associated with a hardware input/output is depicted. The method of FIG. 6 may be performed by a supervisory agent, such as the hypervisor 110 of FIG. 1, the hypervisor 204 of FIG. 2, the hypervisor 304 of FIG. 3, the hypervisor 402 of FIGS. 4 and 5, and the translation table manager 410 of FIGS. 4 and 5.

The method begins when a PCI host bridge may be detected and configured at 602. Moving to 604, a determination may be made that an I/O slot coupled to the PHB is occupied by an I/O adapter. For example, in FIG. 4, the hypervisor 402 may detect the first PHB 407 and determine that the first hardware I/O adapter 471 is occupying the slot 461.

Moving to 606, a determination may be made whether a slot is in a location that is automatically allocated additional direct memory access (DMA) space. For example, in FIG. 4, the hypervisor 402 may determine that the slots 462 and 463 are allocated additional DMA space but the slot 461 is not allocated additional DMA space. If a determination is made, at 606, that the slot is not a location that is allocated additional DMA space, the method proceeds to 608 where one or more characteristics of the I/O adapter are determined. For example, in FIG. 4, the hypervisor 402 may determine one or more of the adapter type 474, the identifier 494, and the identifier 495 of the first hardware I/O adapter 471. The hypervisor 402 may determine whether to allocate the additional DMA space based on the one or more characteristics (e.g., an identifier associated with the I/O adapter, a type of device driver associated with the I/O adapter, a type of operating system assigned to the I/O adapter, or any combination thereof). If the hypervisor determines, at 610, to allocate the additional memory based on the one or more characteristics of the I/O adapter, the method proceeds to 614 where the default DMA window is allocated, the additional memory is allocated, the additional memory is assigned to the I/O adapter, and the method ends, at 616. If the hypervisor determines, at 610, to not allocate the additional memory based on the one or more characteristics of the I/O adapter, the method proceeds to 612 where a default DMA window is allocated, and the method ends at 616. If a determination is made, at 606, that the slot is a location that is allocated additional memory, the method proceeds to 614 where the default DMA window is allocated, the additional memory is allocated, the additional memory is assigned to the I/O adapter, and the method ends, at 616.

Thus, a hypervisor may determine whether to allocate additional DMA space for an I/O adapter based on a location of the slot that the I/O adapter occupies, based on a characteristic of the I/O adapter, an identifier associated with the I/O adapter, a type of device driver associated with the I/O adapter, a type of operating system assigned to the I/O adapter, or any combination thereof. The additional DMA space may be allocated at a first time period, such as an initial program load (IPL) time period, a boot time period, or a run time period. The additional memory may be used create a large address translation table or to create multiple address translation tables.

By enabling a DMA window associated with the I/O adapter to be resized based on the capabilities of the I/O adapter, the device driver may reduce how often the host memory pages are remapped. Reducing remapping of the host memory pages may resulting in faster I/O performance (as compared to when a default size DMA window is used). For example, adapters that have high bandwidth capabilities, multiple ports, multiple virtual functions, 64-bit address, etc. may have higher throughput when used with a DMA window that is larger in size than the default DMA window. For example, the DMA window may be increased in size over a default DMA window size to enable creation of a large translation table based on the 64-bit addressing capabilities of the I/O adapter. As another example, a larger than default-sized DMA window may enable creation of multiple translation tables based on the number of ports or the number of virtual functions associated with the I/O adapter.

Figure 7:
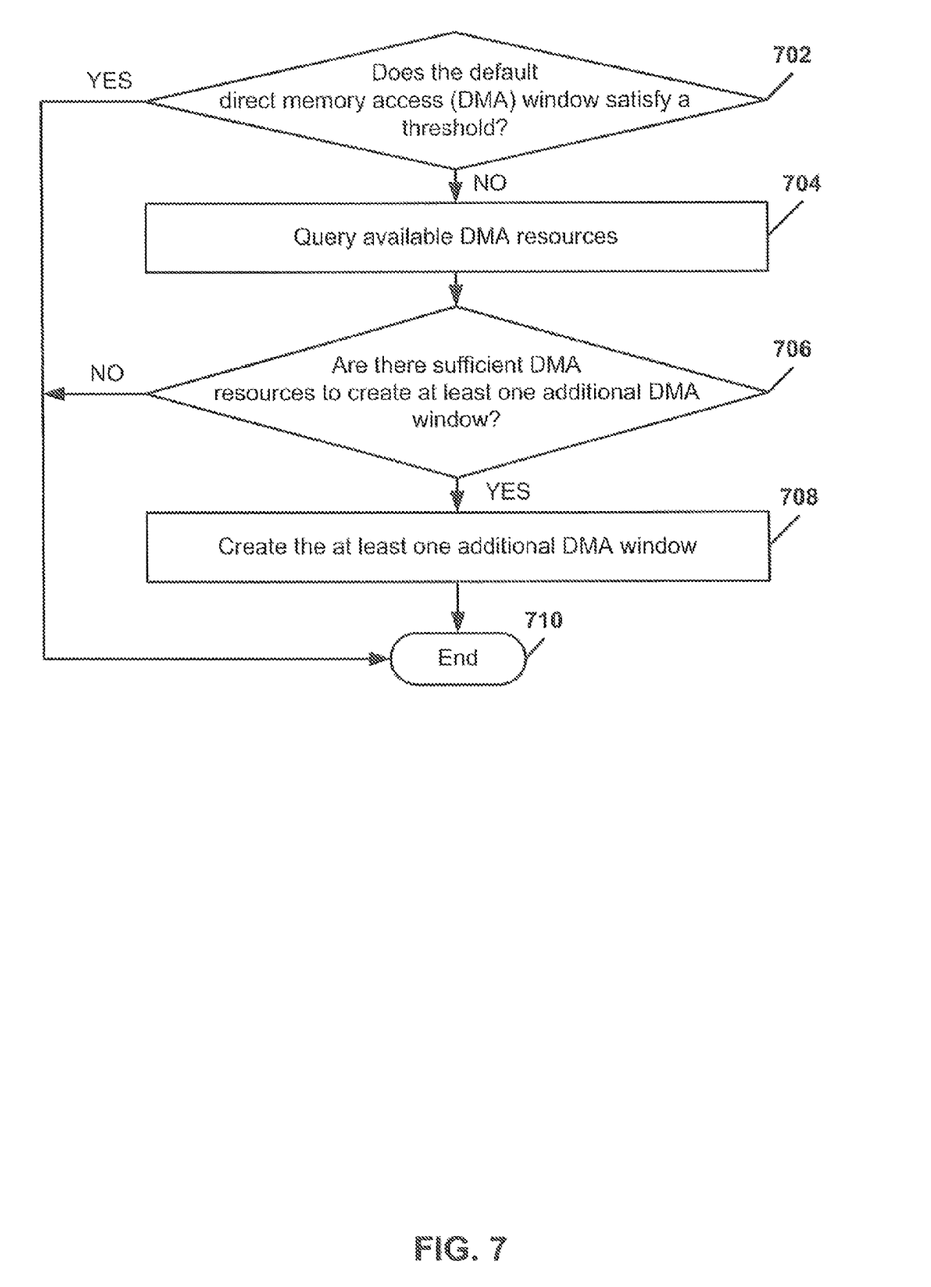
FIG. 7 is a flow diagram of a second method to allocate a direct memory address window associated with a hardware input/output adapter.

Referring to FIG. 7, a flow diagram of a second method to allocate a direct memory address window associated with a hardware input/output adapter is depicted. The method may be performed by a device driver, such as the device driver 313 of FIG. 3, and an operating system, such as the operating system 114 and 115 of FIG. 1, and the operating system 312 of FIG. 3.

The method begins when a determination is made whether the default DMA window satisfies a threshold, at 702. The threshold may be determined based on a characteristic of a particular hardware I/O adapter, a device driver associated with the particular hardware I/O adapter, or a combination of both. For example, a hypervisor may determine that a device driver associated with a particular hardware I/O adapter is capable of utilizing a larger DMA window that has a size that is larger than a default DMA window. To illustrate, the device driver may be capable of 64 bit addressing rather than 32 bit addressing, enabling the use of the larger DMA window. When a determination is made, at 702, that the default DMA window satisfies the threshold, the method ends, at 710.

When a determination is made, at 702, that the default DMA window does not satisfy the threshold, available DMA resources may be queried at 704. Moving to 706, a determination may be made whether there are sufficient DMA resources to create at least one additional DMA window. When a determination is made, at 706, that there are insufficient DMA resources to create at least one additional DMA window, the method proceeds to 710 and the method ends.

When a determination is made, at 706, that there are sufficient DMA resources to create at least one additional DMA window, the method proceeds to 708 where at least one additional DMA window is created, and the method ends at 710. For example, a single, larger DMA window may be created to replace the default DMA window. As another example, multiple DMA windows may be created in addition to the default DMA window, with each of the multiple DMA windows corresponding to a particular characteristic (e.g., corresponding to each port, each physical function, each virtual function, etc.) of the hardware I/O adapter. The creation of the at least one addition DMA window may be performed dynamically, during a run time period.

Figure 8:
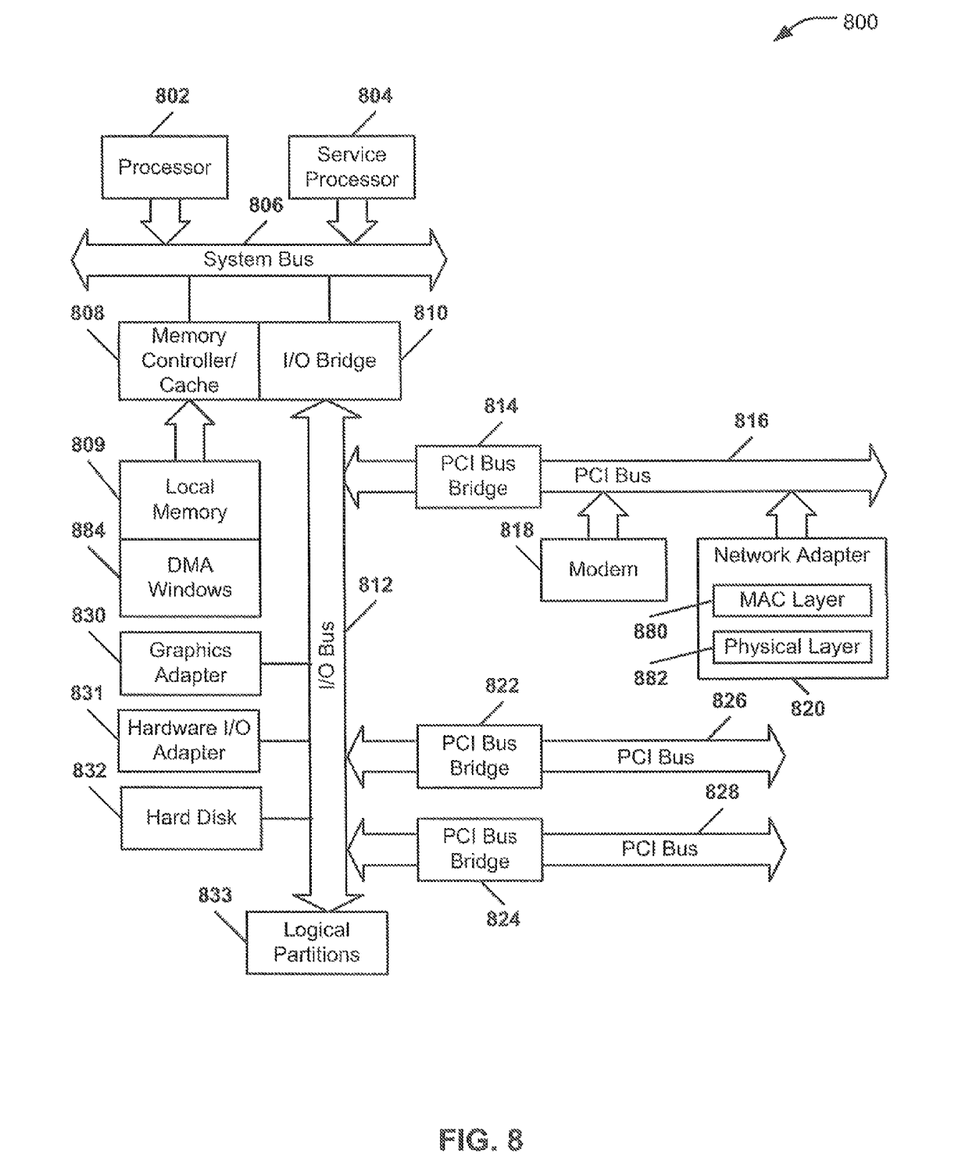
FIG. 8 is a block diagram of an illustrative embodiment of a general computer system.

Referring to FIG. 8, a block diagram of an illustrative embodiment of a general computer system is depicted and generally designated 800. The data processing system 800 may be a symmetric multiprocessor (SMP) system that includes a plurality of shared processors or SMT-capable processors, such as processors 802 and 804 connected to system bus 806. Alternatively, a single processor system may be employed. In the depicted example, processor 804 may be a service processor. Each SMT-capable processor may be capable of concurrently executing multiple hardware threads on the one processor.

Connected to system bus 806 may be memory controller/cache 808, which provides an interface to local memory 809. One or more DMA windows 884 may be located in the local memory 809. The DMA windows 884 may enable logical partitions 833 to access virtual functions of a hardware I/O adapter 831 via direct memory access. An I/O bus bridge 810 may be connected to a system bus 806 to provide an interface to I/O bus 812. A memory controller/cache 808 and an I/O bus bridge 810 may be integrated as depicted.

A peripheral component interconnect (PCI) bus bridge 814 connected to I/O bus 812 may provide an interface to PCI local bus 816. In FIG. 8, the term PCI in this application may also refer to variations and extensions of PCI, such as PCI express (PCIe). Multiple modems may be connected to PCI bus 816. Typical PCI bus implementations may support PCI expansion slots or add-in connectors. Communications links to network computers may be provided via modem 818 and network adapter 820 connected to PCI local bus 816 through add-in boards.

Network adapter 820 may include a physical layer 882 which enables analog signals to go out to a network, such as for example, an Ethernet network via an R45 connector. A media access controller (MAC) 880 may be included within network adapter 820. Media access controller (MAC) 880 may be coupled to bus 816 and processes digital network signals. MAC 880 may serve as an interface between bus 816 and physical layer 882. MAC 880 may perform a number of functions involved in the transmission and reception of data packets. For example, during the transmission of data, MAC 880 may assemble the data to be transmitted into a packet that includes address and error detection fields. During the reception of a packet, MAC 880 may disassemble the packet and perform address checking and error detection. In addition, MAC 880 may perform encoding/decoding of digital signals prior to transmission, perform preamble generation/removal, and bit transmission/reception.

Additional PCI bus bridges 822 and 824 may provide interfaces for additional PCI buses 826 and 828, from which additional modems or network adapters may be supported. In this manner, data processing system 800 may allow connections to multiple network computers. A memory-mapped graphics adapter 830 and hard disk 832 may be directly or indirectly connected to I/O bus 812.

Service processor 804 may interrogate system processors, memory components, and I/O bridges to generate and inventory the system 800. Service processor 804 may execute Built-In-Self-Tests (BISTs), Basic Assurance Tests (BATs), and memory tests on one or more of the elements in the system 800. Any error information for failures detected during the BISTs, BATs, and memory tests may be gathered and reported by service processor 804.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
   detecting a peripheral component interconnect host bridge;
   determining that a slot coupled to the peripheral component interconnect host bridge is occupied by an input/output adapter;
   determining one or more characteristics of the input/output adapter;
   determining whether the input/output adapter is capable of using additional address translation table memory based on the one or more characteristics of the input/output adapter; and
   allocating the additional address translation table memory for the input/output adapter in response to determining that the input/output adapter is capable of using the additional address translation table memory.

2. The computer-implemented method of claim 1, further comprising:
   determining whether the input/output slot is a location that is allocated the additional address translation table memory; and
   allocating the additional address translation table memory for the input/output adapter in response to determining that the input/output slot is a location that is allocated the additional address translation table memory.

3. The computer-implemented method of claim 1, allocating a default address translation table memory for the input/output adapter.

4. The computer-implemented method of claim 1, wherein the input/output adapter comprises a single root input/output virtualization adapter.

5. The computer-implemented method of claim 1, wherein the input/output adapter is one of: a fiber channel compliant input/output adapter, a serial attached small computer systems interface compliant input/output adapter, an Ethernet compliant input/output adapter, an infiniband compliant input/output adapter, or any combination thereof.

6. The computer-implemented method of claim 1, wherein the additional address translation table memory for the input/output adapter is allocated during an initial program load time period.

7. The computer-implemented method of claim 1, wherein determining whether the input/output adapter is capable of using the additional address translation table memory further comprises:
retrieving one or more identifiers associated with the input/output adapter;
determining that the input/output adapter is capable of using the additional address translation table memory based on the one or more identifiers.

8. The computer-implemented method of claim 7, wherein the one or more identifiers include: a device identifier, a vendor identifier, a subsystem vendor, a subsystem type, a host bridge vendor, and a host bridge type.

9. An apparatus, comprising:
a processor;
a memory to store program code, the program code executable by the processor to:
identify a default address translation table memory that is allocated for use by an input/output adapter;
determine whether the default address translation table memory satisfies a threshold of a device driver associated with the input/output adapter;
determine whether there are sufficient resources to create at least one additional direct memory access window in response to determining that the default address translation table memory does not satisfy the threshold of the device driver; and
create the at least one additional direct memory access window in response to determining that there are sufficient resources.

10. The apparatus of claim 9, wherein the program code is further executable by the processor to combine the default address translation table memory with the at least one additional direct memory access window to create a combined direct memory access window.

11. The apparatus of claim 9, wherein the program code is further executable by the processor to create the at least one additional direct memory access window based on a number of ports of the input/output adapter.

12. The apparatus of claim 9, wherein the program code is further executable by the processor to create the at least one additional direct memory access window based on a number of physical functions that the input/output adapter is capable of hosting.

13. The apparatus of claim 9, wherein the program code is further executable by the processor to create the at least one additional direct memory access window based on a number of virtual functions that the input/output adapter is capable of hosting.

14. The apparatus of claim 13, wherein the program code is further executable by the processor to create the at least one additional direct memory access window based on one or more characteristics of the virtual functions.

15. The apparatus of claim 9, wherein the at least one additional direct memory access window is created during a runtime period.

16. A computer program product comprising a non-transitory computer usable medium having computer usable program code embodied therewith, the computer usable program code executable by a processor to:
allocate a default address translation table memory to store an address translation table associated with an input/output adapter, the input/output adapter capable of hosting a plurality of virtual functions;
determine a device identifier associated with the input/output adapter;
determine whether the input/output adapter is capable of using additional address translation table memory based on the device identifier; and
allocate the additional address translation table memory for the input/output adapter in response to determining that the input/output adapter is capable of using the additional address translation table memory.

17. The computer program product of claim 16, wherein the computer usable program code is further executable by the processor to allocate the additional address translation table memory for the input/output adapter in response to determining that the input/output adapter is in a location that is automatically allocated the additional address translation table memory.

18. The computer program product of claim 16, wherein the computer usable program code is further executable by the processor to:
determine that the default address translation table memory does not satisfy a threshold; and
create a new address translation table memory in response to determining that there are sufficient memory resources available.

19. The computer program product of claim 18, combining the default address translation table memory and the new address translation table memory to create a larger address translation table memory.

20. The computer program product of claim 19, subdividing the larger address translation table memory to create a plurality of address translation tables based on a number of ports associated with the input/output adapter.

* * * * *